United States Patent
Hata

(10) Patent No.: US 11,350,333 B2
(45) Date of Patent: May 31, 2022

(54) RADIO COMMUNICATION EQUIPMENT AND CONTROL METHOD THEREFOR

(71) Applicant: KYOCERA Corporation, Kyoto (JP)

(72) Inventor: Mitsutaka Hata, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/585,770

(22) Filed: Sep. 27, 2019

(65) Prior Publication Data

US 2020/0029266 A1 Jan. 23, 2020

Related U.S. Application Data

(63) Continuation of application No. PCT/JP2018/012414, filed on Mar. 27, 2018.

(30) Foreign Application Priority Data

Mar. 28, 2017 (JP) .............................. JP2017-062163

(51) Int. Cl.
| | |
|---|---|
| *H04W 36/30* | (2009.01) |
| *H04W 76/18* | (2018.01) |
| *H04W 4/90* | (2018.01) |
| *H04W 76/50* | (2018.01) |
| *H04W 4/40* | (2018.01) |

(Continued)

(52) U.S. Cl.
CPC ....... *H04W 36/305* (2018.08); *H04L 12/2854* (2013.01); *H04W 4/40* (2018.02); *H04W 4/90* (2018.02); *H04W 36/0022* (2013.01); *H04W 36/0066* (2013.01); *H04W 76/18* (2018.02); *H04W 76/50* (2018.02)

(58) Field of Classification Search
CPC ........... H04W 36/305; H04W 36/0022; H04W 36/0066; H04W 76/18; H04W 4/90; H04W 76/50; H04W 4/40; H04W 4/16; H04W 88/06; H04W 24/04; H04L 12/2854; H04M 1/00; H04M 11/04; G08B 21/00; G08B 25/08; G08B 25/10
See application file for complete search history.

(56) References Cited

U.S. PATENT DOCUMENTS

| | | | |
|---|---|---|---|
| 5,987,334 A | 11/1999 | Kaku | |
| 9,204,256 B2 | 12/2015 | Lin et al. | |
| 9,374,697 B2 * | 6/2016 | Shih | ...................... H04W 76/50 |

(Continued)

FOREIGN PATENT DOCUMENTS

| | | |
|---|---|---|
| CN | 105075356 A | 11/2015 |
| CN | 105580431 A | 5/2016 |

(Continued)

*Primary Examiner* — Marcos L Torres
(74) *Attorney, Agent, or Firm* — Studebaker & Brackett PC

(57) ABSTRACT

A radio communication equipment installed on a vehicle comprises a radio communicator configured to perform radio communication with a network, and a controller configured to perform call origination to a public safety answering point (PSAP) via the network, wherein the controller is configured to perform first call origination to the PSAP upon occurrence of an emergency, determine whether there is an abnormality in call upon the first call origination, and perform second call origination to the PSAP by a scheme different from a scheme used for the first call origination when there is an abnormality in call upon the first call origination.

10 Claims, 6 Drawing Sheets

(51) Int. Cl.
*H04L 12/28* (2006.01)
*H04W 36/00* (2009.01)

(56) References Cited

U.S. PATENT DOCUMENTS

| | | | |
|---|---|---|---|
| 9,661,460 B2 | 5/2017 | Lin et al. | |
| 9,894,601 B2 | 2/2018 | Murray et al. | |
| 2010/0167722 A1* | 7/2010 | Madhavan | H04W 76/18 |
| | | | 455/426.2 |
| 2011/0269503 A1 | 11/2011 | Park et al. | |
| 2012/0231760 A1* | 9/2012 | Zhu | H04W 76/50 |
| | | | 455/404.1 |
| 2013/0329567 A1* | 12/2013 | Mathias | H04W 36/30 |
| | | | 370/242 |
| 2014/0256283 A1 | 9/2014 | Lin et al. | |
| 2014/0274006 A1 | 9/2014 | Mutya et al. | |
| 2015/0092611 A1 | 4/2015 | Ponukumati et al. | |
| 2015/0326447 A1* | 11/2015 | Yoon | H04L 43/10 |
| | | | 709/224 |
| 2016/0112941 A1 | 4/2016 | Desai et al. | |
| 2016/0142946 A1 | 5/2016 | Ponukumati et al. | |
| 2016/0345149 A1 | 11/2016 | Chuttani et al. | |

FOREIGN PATENT DOCUMENTS

| | | |
|---|---|---|
| DE | 10 2012 213329 A1 | 5/2014 |
| DE | 10 2016 114321 A1 | 2/2017 |
| EP | 1 205 730 A1 | 5/2002 |
| EP | 3 065 447 A1 | 9/2016 |
| JP | H09-233555 A | 9/1997 |
| JP | 2000-048288 A | 2/2000 |
| JP | 2010-011323 A | 1/2010 |
| JP | 2016-140079 A | 8/2016 |
| JP | 2016-149668 A | 8/2016 |
| JP | 2016-167264 A | 9/2016 |
| JP | 2016533660 A | 10/2016 |
| TW | 469418 B | 12/2001 |
| WO | 2015/157112 A1 | 10/2015 |
| WO | 2016/064768 A1 | 4/2016 |

* cited by examiner

RADIO COMMUNICATION EQUIPMENT AND CONTROL METHOD THEREFOR

RELATED APPLICATIONS

The present application is a continuation based on PCT Application No. PCT/JP2018/012414, filed on Mar. 27, 2018, which claims the benefit of Japanese Patent Application No. 2017-062163 (filed on Mar. 28, 2017). The content of which is incorporated by reference herein in their entirety.

TECHNICAL FIELD

The present invention relates to a radio communication equipment used in an emergency call system and a control method thereof.

BACKGROUND ART

Nowadays, an emergency call system for vehicles called ERA-GLONASS is implemented in Russia. In Europe, the implementation of an emergency call system for vehicles called eCall is scheduled in future. The vehicle emergency call system is a system that automatically makes a report to a nearest police department or fire department through an emergency call center in an emergency, such as a vehicular accident.

For more detailed description, in this emergency call system, a radio communication equipment for telematics installed on an automobile is used. For example, when an automobile encounters a traffic accident and any other accident, the radio communication equipment quickly makes a report to a public safety answering point (PSAP) including an emergency call center.

SUMMARY

A radio communication equipment of the present application is a radio communication equipment installed on a vehicle, which comprises a radio communicator configured to perform radio communication with a network, and a controller configured to perform call origination to a public safety answering point (PSAP) via the network, wherein the controller is configured to perform first call origination to the PSAP upon occurrence of an emergency, determine whether there is an abnormality in call upon the first call origination, and perform second call origination to the PSAP by a scheme different from a scheme used for the first call origination when there is an abnormality in call upon the first call origination.

DESCRIPTION OF EMBODIMENTS

The present disclosure is to provide a radio communication equipment and a control method thereof that can appropriately deal with the case in which a vehicle emergency call system is not normally operated when the radio communication equipment originates to an emergency call center.

In the following, an embodiment will be described with reference to the drawings.

Figure 1:
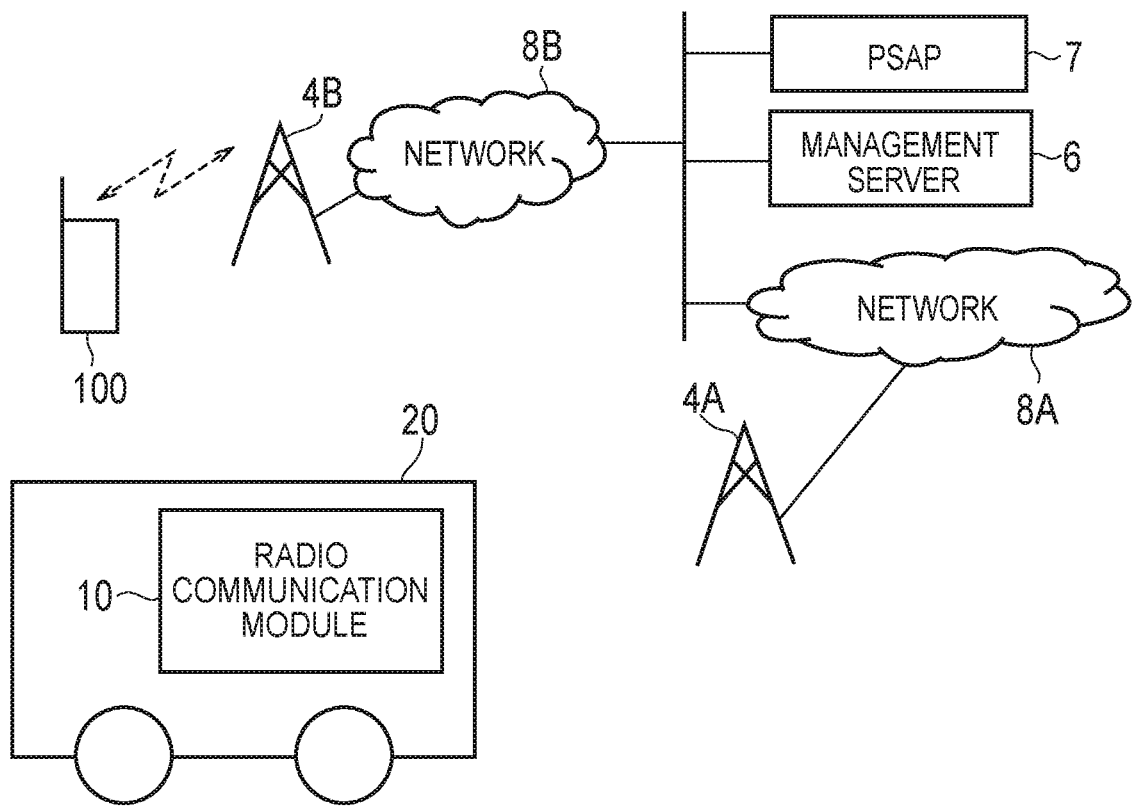
FIG. 1 is a view illustrating the arrangement of a radio communication system according to an embodiment.

FIG. 1 is a block diagram of a radio communication system according to an embodiment. The radio communication system illustrated in FIG. 1 has a vehicle 20 installed with a radio communication module 10, a base station 4A and a base station 4B, a network 8A and a network 8B, a radio terminal 100, a management server 6, and a PSAP 7.

The base station 4A, the base station 4B, the network 8A, and the network 8B are provided by a network operator A. Hereinafter, when the base station 4 or the network 8 is not distinguished for description, the base station 4 or the network 8 is simply described, whereas when the base station 4 or the network 8 is distinguished for description, the base stations 4A and 4B, or the networks 8A and 8B are described.

The base station 4 may cope with any mobile telecommunications systems, including second-generation mobile telecommunications systems, such as global system for mobile communications (GSM) (registered trademark), third-generation mobile telecommunications systems, such as code division multiple access (CDMA), or fourth-generation mobile telecommunications systems, such as long term evolution (LTE).

The radio communication module 10 implements various functions. For example, the radio communication module 10 is configured to originate an outgoing call to the PSAP 7 (including an emergency call center) at the time of an emergency when implementing an emergency report system. In addition, after call with the operator of the PSAP 7, the radio communication module 10 sometimes receives an incoming call from the PSAP 7. The radio communication module 10 may be configured to originate an outgoing call or receive an incoming call by using an IP telephone based on Voice over Internet Protocol (VoIP) or the like.

Furthermore, there are known telematics services that provide information services real time in combination of the vehicle 20 with a communication system. In the telematics services, map data and point of interest (POI) data for data updates of a navigation system from a server on the network 8. In the telematics services, diagnostic information on the equipments installed on the vehicle is uploaded to the server on the network 8. The radio communication module 10 performs such downloads and uploads via the network 8.

In the embodiment, the radio communication module 10 is instantiated as an in vehicle system (IVS) installed on a vehicle, such as the vehicle 20. In the embodiment, the vehicle 20 is described as an example of a vehicle. Of course, the vehicle may be any moving transportation, such as ships or trains. The radio communication module 10 may be installed on portable terminals, such as cellular telephones or smartphones. The radio communication module 10 may be a module for internet of things (IoT).

The radio communication module 10 may cope with second-generation mobile telecommunications systems, third-generation mobile telecommunications systems, or fourth-generation mobile telecommunications systems. The radio communication module 10 may communicate with the radio terminal 100. The radio communication module 10 may have various functions and functions that execute programs created by a user.

The network operator A that manages the base station 4 or the network 8 provides network operator's mobile communications services to users that have concluded a contract with the network operator.

Figure 2:
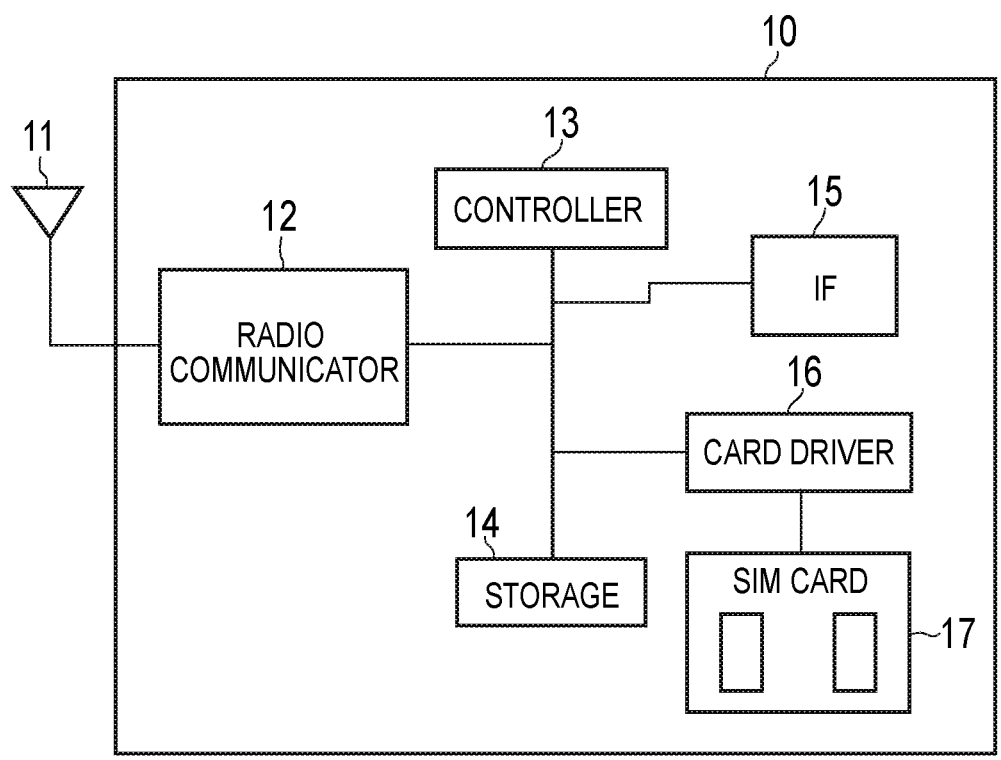
FIG. 2 is a block diagram of a radio communication module according to this embodiment.

FIG. 2 is a block diagram of the radio communication module according to the embodiment. The radio communication module illustrated in FIG. 2 has an antenna 11, a radio communicator 12, a controller 13, a storage 14, an IF 15, a card driver 16, and a subscriber identity module (SIM) card 17.

The antenna 11 transmits and receives radio signals with the base station 4.

The radio communicator 12 communicates with the base station 4 by radio communication through the antenna 11. The radio communicator 12 has an analog signal processor and a digital signal processor.

The analog signal processor performs amplification, an analog-to-digital conversion process, and any other process of radio signals received from the antenna 11, performs analog amplification, including a digital-to-analog conversion process, of the digital signals transferred from the digital signal processor, and transmits the analog signals through the antenna 11.

The digital signal processor encodes data transferred from the controller 13, and converts the data into digital signals such that the data can be transmitted through the communication channel of radio signals, whereas the digital signal processor decodes the digital signals transferred from the analog signal processor, and transfers the decoded data to the controller 13.

The controller 13 is mainly configured of a microcomputer formed of a central processing unit (CPU) that executes various programs, a read only memory (ROM), a random access memory (RAM), a backup RAM, an input/output (I/O), and any other component (none of them are illustrated in the drawings), and executes various control programs stored on the ROM to execute various processes. The controller 13 executes processes necessary to control the radio communicator 12.

The storage 14 is configured of an electronically erasable and programmable read only memory (EEPROM) that can electrically rewrite the content, for example, and the storage 14 stores programs and information necessary to control the radio communicator 12.

The IF 15 is a universal serial bus IF and any other IF, and is connected to a display, a microphone, and a speaker, or a navigation system, for example.

The card driver 16 drives an IC card referred to as a SIM card (or a UIM card), i.e., an information card. The card driver 16 may accept and reject the SIM card 17. In the case in which the card driver 16 is instructed to read or write configuration information by the controller 13, the card driver 16 reads configuration information recorded on the SIM card 17, and writes configuration information on the SIM card 17.

Generally, the SIM card is an IC card recording information that identifies a subscriber, network operator identification information that identifies a network operator, and information on services usable by the subscriber in contract, and any other information.

The SIM card 17 may be an embedded eSIM (embedded SIM). The SIM card 17 may be disposed on the outside of the radio communication module 10. The SIM card 17 may be supplied by the network operator, or may be obtained through other means. The user mounts or connects the supplied SIM card 17 to the radio communication module 10 to use the radio communication module 10.

The SIM card records configuration information necessary to receive services. For example, there are various pieces of configuration information, such as information in the registration of location information and information on a telephone number (e.g. an IVS telephone number). These pieces of information are transmitted to the management server 6 on the network 8.

The SIM card 17 may be a dual SIM. The dual SIM has two SIM card slots and allows one radio communication module or terminal to arbitrarily use a network corresponding to a SIM card. A dual SIM sometimes indicates an external adaptor that enables the use of two SIM cards.

In the following, the operation of the radio communication system according to the embodiment will be described.

In the radio communication system according to the embodiment, the emergency call system eCall is described. A part of the specification of eCall is prescribed in TS 24.008 (Core Network Protocol; Stage3) of the third generation partnership project (3GPP). The controller 13 makes emergency call origination as an emergency call process via the network.

Figure 3:
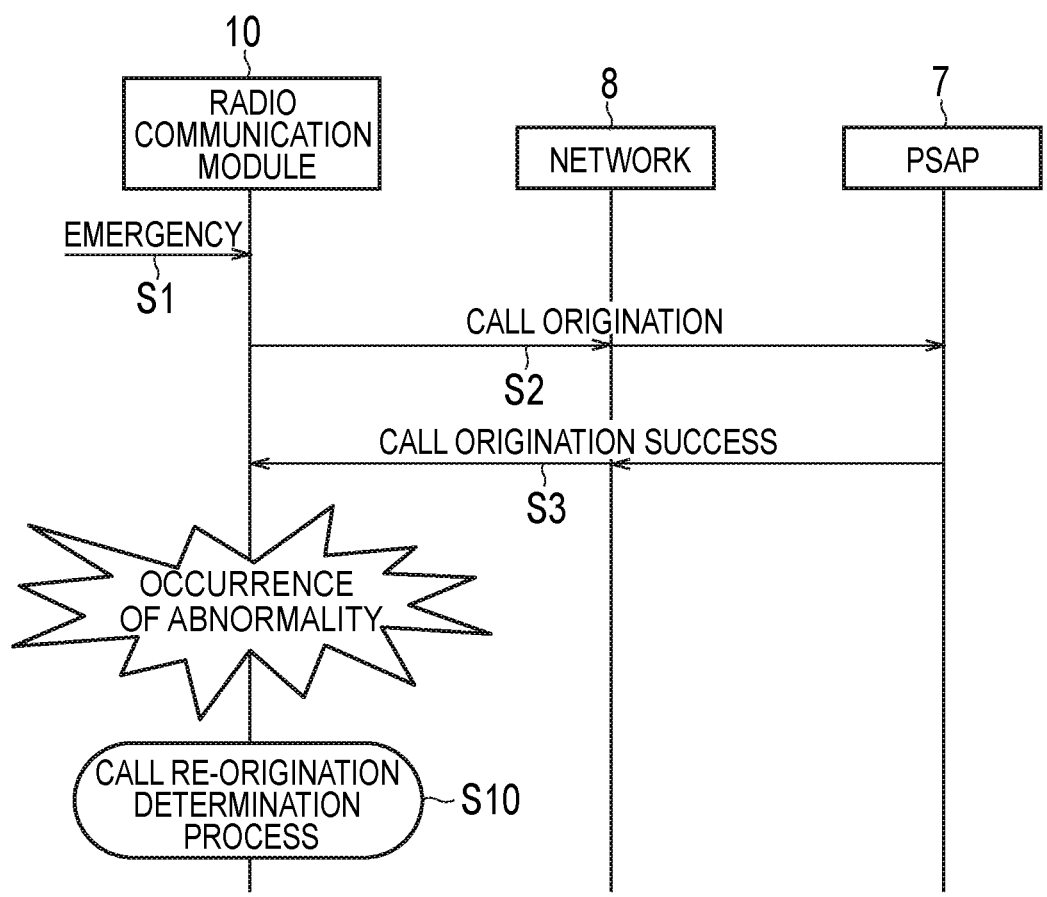
FIG. 3 is a sequence chart representing the operation of the radio communication system according to this embodiment.

FIG. 3 is a sequence diagram illustrating the operation of the radio communication system according to the embodiment.

First of all, when an emergency occurs, an emergency event is notified to the radio communication module 10 (step S1). An emergency is, for example, a traffic accident or an accident or injury to the user of the radio communication module 10, but is not limited to an accident or injury in particular. An emergency event may be automatically generated when the sensor installed on the vehicle 20 detects an emergency or may be manually generated by the user when he/she detects an emergency.

The controller 13 originates an outgoing call for an emergency (to be also referred to as an emergency call hereinafter) to the PSAP 7 (step S2). The radio communication module 10 receives a success notification of an emergency call (step S3). In general, when an emergency call succeeds, the driver or another person of the vehicle 20 can talk with the operator of the PSAP 7.

If, however, some trouble occurs in the network 8, the driver or the like sometimes encounters an abnormality such as a failure to hear the sound of call. The radio communication module 10 performs call re-origination determination process to prepare for such an abnormality (step S10).

Figure 4:
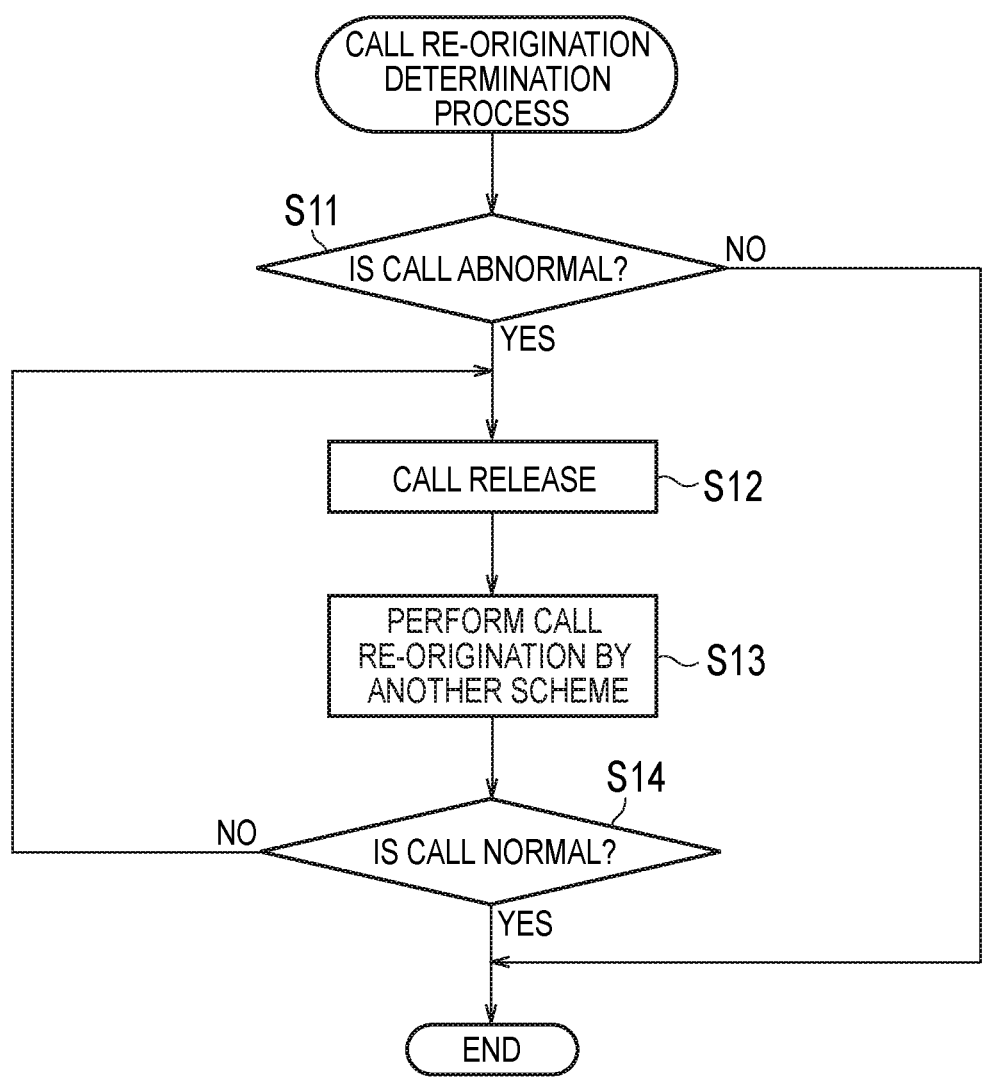
FIG. 4 is a flowchart representing call re-origination determination process for an emergency call in the radio communication module.

FIG. 4 is a flowchart representing call re-origination determination process for an emergency call in the radio communication module 10 and illustrating the details of step S10.

First of all, the controller 13 of the radio communication module 10 analyzes an abnormality in the sound of call to determine whether there is an abnormality (step S11). In analyzing the sound of call, for example, the controller 13 performs analysis to determine whether a speech signal is disconnected, like when no background noise of the call partner can be heard. The controller 13 may determine whether the waveform of speech data or speech signal has not sometimes been detected for a predetermined period, as a method of analyzing disconnection of call. The controller 13 also analyzes whether an abnormal sound having a frequency different from that of human voice continues.

If there is no abnormality in call, the processing is terminated. If there is an abnormality in call, the controller 13 releases the current emergency call (step S12).

The controller 13 then originates an outgoing call to the PSAP by a scheme different from that used for call origination in step S2 (step S13). Note that a call abnormality is sometimes temporary, and hence the controller 13 may originate an outgoing call to the same RAT and the same PSAP.

When, for example, the SIM card 17 is a dual SIM, call origination in step S2 is performed by using one SIM card of the dual SIM, and call origination in step S13 is performed by using the other SIM card. This is an effective means in countries where radio communication modules or terminals having a dual SIM have been widely used. Note that a SIM card is not essential. The radio communication module 10 may be configured to originate an emergency call to a radio network that can be detected by the radio communication module 10 without SIM card.

When telephone companies respectively provide lines to the PSAP, the radio communication module 10 can switch the lines provided by the telephone companies by using SIM cards for the respective telephone companies. In addition, when the radio communication module 10 can switch the lines provided by the respective telephone companies by using telephone numbers, the radio communication module 10 may respectively use different telephone numbers to originate outgoing calls in steps S2 and S13.

In another example, the radio communicator 12 has two Radio Access Technologies (RATs), for example, GSM (registered trademark) and CDMA or GSM (registered trademark) and LTE. For example, call origination in step S2 is performed by using GSM (registered trademark), and call origination in step S13 is performed by using CDMA or LTE.

In still another example, the radio communicator 12 can perform call origination by using both a telephone scheme and an Internet protocol scheme (so-called VoIP: Voiceover Internet Protocol). The radio communicator 12 performs call origination in step S2 by using a telephone scheme such as GSM (registered trademark) or CDMA, and call origination in step S13 by using an Internet protocol scheme, or performs call origination in step S2 by using an Internet protocol scheme, and call origination in step S13 by using a telephone scheme such as GSM (registered trademark) or CDMA.

In still another example, the PSAP to which call origination in step S2 is performed may differ from the PSAP to which call origination in step S13 is performed. For example, call origination in step S2 uses a telephone number different from that used for call origination in step S13. Any one of the above telephone numbers may be an emergency report telephone number designated in the country, such as 911.

Assume that the PSAP to which call origination in step S2 is performed is the same as that to which call origination in step S13 is performed, and there are lines to the PSAP for the respective telephone companies. In this case, the radio communication module 10 can switch the lines of the telephone companies by assigning numbers for identifying the telephone companies to telephone numbers. It is known that in a long-distance phone call, for example, in a phone call to a PSAP in a foreign country, the occurrence frequency of abnormality such as a failure to hear the sound of call is high.

If call upon call origination in step S13 is normal (YES in step S14), the processing is terminated. If there is an abnormality in call upon call origination in step S13 (NO in step S14), the processing from step S12 is repeated. If call origination fails in step S13, the processing is repeated from step S13.

Figure 5:
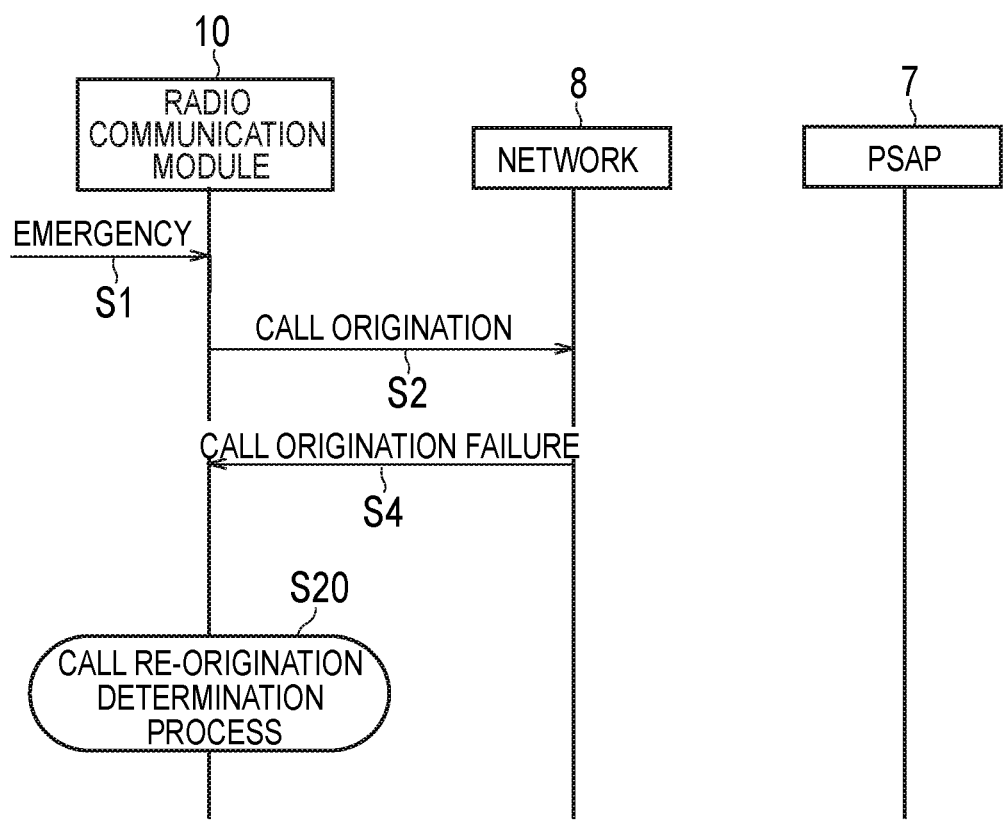
FIG. 5 is a sequence chart representing the operation of the radio communication system when an emergency call fails.

FIG. 5 is a sequence chart representing the operation of the radio communication system when an emergency call fails.

First of all, the operation in steps S1 and S2 is the same as that described with reference to FIG. 3. When there is an abnormality in call upon call origination in step S2, the radio communication module 10 receives a notification of an emergency call failure from the network 8 (step S4). In this case, call re-origination determination process is performed (step S20).

For example, a case in which the radio communication module 10 receives a notification of an emergency call failure is a case in which a call origination is rejected due to a factor in the network 8, a case in which a congestion state is detected when the radio communication module 10 is attached to the EPS defined in 3GPP, or a case in which authentication for the information (telephone number) of a SIM 17 fails.

Figure 6:
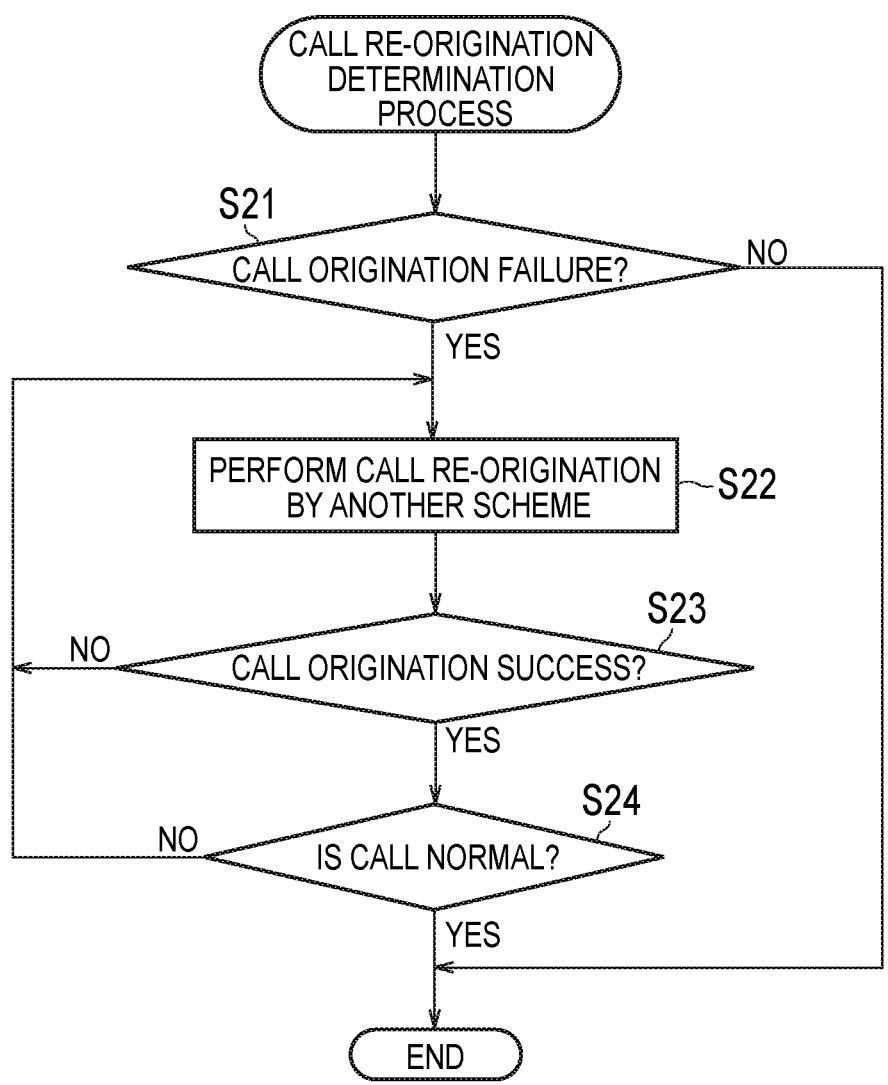
FIG. 6 is a flowchart representing call re-origination determination process for an emergency call in the radio communication module.

FIG. 6 is a flowchart representing call re-origination determination process for emergency call in the radio communication module 10 and illustrating the details of step S20.

First of all, the controller 13 of the radio communication module 10 checks whether call origination in step S2 has succeeded or failed (step S21). If the call origination has succeeded, the controller 13 terminates the processing.

If the call origination has failed, the controller 13 performs call origination to the PSAP by a scheme different from that used for call origination in step S2 (step S22). The operation in step S22 is the same as that described with respect to step S13.

If the call origination in step S22 has failed (NO in step S23), the controller 13 repeats the processing from step S22. If the call origination in step S22 has succeeded (YES in step S23), the controller 13 of the radio communication module 10 analyzes an abnormality in the sound of call to determine whether there is an abnormality (step S24).

If the call is normal (YES in step S24), the controller 13 terminates the processing. If there is an abnormality in the call (NO in step S24), the controller 13 repeats the processing from step S22.

As described above, even if there is an abnormality in call upon emergency call or emergency call has failed, the radio communication module 10 performs call re-origination by using different schemes, and hence can improve the possibility of connection to the operator of the PSAP.

INDUSTRIAL APPLICABILITY

The present invention provides a radio communication equipment that can appropriately handle problems caused by the malfunction of a vehicle emergency report system when originating an outgoing call to an emergency call center, and a control method for the radio communication equipment.

The invention claimed is:
1. A radio communication equipment installed on a vehicle, comprising:
a radio communicator configured to perform radio communication with a network;

a controller configured to perform call origination to a public safety answering point (PSAP) via the network; and a card driver configured to drive a first information card and a second information card on which subscriber information is recorded, wherein the radio communicator is configured to perform, using the first information card, the radio communication with the network which supports the call origination, and the controller is configured to:

perform first call origination to the PSAP upon occurrence of an emergency using the first information card, the first call origination including a call in which a communication is transmitted from the radio communicator, determine whether there is an abnormality in sound of the call upon the first call origination, and perform second call origination to the PSAP using the second information card when there is an abnormality in the sound of the call upon the first call origination.

2. The radio communication equipment according to claim 1, wherein the first call origination is performed by a radio access technology (RAT), and the second call origination is performed by using another RAT.

3. The radio communication equipment according to claim 1, wherein the first call origination is performed by a telephone scheme and the second call origination is performed by an Internet protocol scheme, or the first call origination is performed by an Internet protocol scheme and the second call origination is performed by a telephone scheme.

4. The radio communication equipment according to claim 1, wherein a PSAP to which the first call origination is performed is different from a PSAP to which the second call origination is performed.

5. The radio communication equipment according to claim 1, wherein the controller is configured to perform the second call origination when a case in which there is an abnormality in sound of the call upon the first call origination is a case in which a speech signal is disconnected by a trouble in the network.

6. The radio communication equipment according to claim 1, wherein the controller is configured to perform the second call origination when a case in which there is an abnormality in sound of the call upon the first call origination is a case in which a failure of the call origination is notified from the network.

7. A vehicle on which the radio communication equipment according to claim 1 is installed.

8. A control method for a radio communication equipment installed on a vehicle, the radio communication equipment comprising a radio communicator configured to perform radio communication with a network, a controller configured to perform call origination to a public safety answering point (PSAP) via the network, and a card driver configured to drive a first information card and a second information card on which subscriber information is recorded, the control method comprising the steps of:

performing, using the first information card, the radio communication with the network which supports the call origination;

performing first call origination to the PSAP upon occurrence of an emergency using the first information card, the first call origination including a call in which a communication is transmitted from the radio communicator, determining whether there is an abnormality in sound of the call upon the first call origination; and performing second call origination to the PSAP using the second information card when there is an abnormality in the sound of the call upon the first call origination.

9. The radio communication equipment according to claim 1, wherein the controller is further configured to receive a notification from the network that the first call origination was a failure when the call includes the abnormality and perform the second call origination after receiving the notification from the network that the first call origination was a failure.

10. The radio communication equipment according to claim 1, when there is an abnormality in the sound of the call upon the first call origination is when waveform of speech data or speech signal has not sometimes been detected for a predetermined period or when an abnormal sound having a frequency different from that of human voice continues for a predetermined period.

* * * * *